United States Patent
Minezawa et al.

(10) Patent No.: US 8,931,260 B2
(45) Date of Patent: Jan. 13, 2015

(54) SELECTIVE CATALYTIC REDUCTION SYSTEM

(75) Inventors: Masanobu Minezawa, Fujisawa (JP); Shinji Hara, Fujisawa (JP); Tetsuya Murata, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 100 days.

(21) Appl. No.: 13/698,168

(22) PCT Filed: May 16, 2011

(86) PCT No.: PCT/JP2011/061223
§ 371 (c)(1),
(2), (4) Date: Nov. 15, 2012

(87) PCT Pub. No.: WO2011/145573
PCT Pub. Date: Nov. 24, 2011

(65) Prior Publication Data
US 2013/0061949 A1    Mar. 14, 2013

(30) Foreign Application Priority Data
May 17, 2010   (JP) .................................. 2010-113747

(51) Int. Cl.
*F01N 3/00*    (2006.01)
*F16L 53/00*   (2006.01)
*F01N 3/20*    (2006.01)

(52) U.S. Cl.
CPC .............. *F16L 53/001* (2013.01); *F01N 3/208* (2013.01); *F01N 2610/02* (2013.01);
(Continued)

(58) Field of Classification Search
CPC .............................................. F01N 2009/0223
USPC ............ 60/286, 295, 297, 298, 301, 303, 320
See application file for complete search history.

(56) References Cited

U.S. PATENT DOCUMENTS

| 7,647,767 B2 * | 1/2010 | Osaku et al. ..................... 60/286 |
| 7,895,829 B2 * | 3/2011 | Suzuki et al. .................... 60/286 |

(Continued)

FOREIGN PATENT DOCUMENTS

| EP | 2175111 A1 * | 4/2010 | ..................... 60/286 |
| JP | 2000-303826 | 10/2000 | |

(Continued)

OTHER PUBLICATIONS

Extended European Search Report mailed Nov. 27, 2013 in corresponding European Patent Application No. 11783507.4.
(Continued)

*Primary Examiner* — Binh Q Tran
(74) *Attorney, Agent, or Firm* — Staas & Halsey LLP

(57) ABSTRACT

A selective catalytic reduction system that can defrost urea aqueous solution without interruption of warm air of an engine or heating of a vehicle cabin. The system includes a defrosting control unit to open a tank heater valve at the time of starting the engine and close the tank heater valve when the temperature of the urea aqueous solution detected by a temperature sensor reaches a predetermined defrosting completion determination value, and a warm air priority control unit to prohibit the opening of the valve by the defrosting control unit when the temperature of the cooling water is less than a predetermined defrosting permission value and permit the opening of the valve by the defrosting control unit when the temperature of the cooling water is equal to or more than the defrosting permission value.

2 Claims, 2 Drawing Sheets

(52) U.S. Cl.
    CPC .............. *F01N 2610/1406* (2013.01); *F01N 2900/0404* (2013.01); *F01N 2900/1814* (2013.01); *F01N 2900/1818* (2013.01); *F01N 2610/105* (2013.01); *F01N 2900/12* (2013.01); *F01N 2900/1811* (2013.01); *F01P 2060/08* (2013.01); *F01P 2060/16* (2013.01); *F01P 2060/18* (2013.01); *Y02T 10/24* (2013.01)
    USPC ............... 60/286; 60/295; 60/298; 60/303; 60/320

(56) References Cited

U.S. PATENT DOCUMENTS 8,303,174 B2 * 11/2012 Kasahara .................. 374/144
8,561,392 B2 * 10/2013 Ogunleye et al. ............ 60/286

FOREIGN PATENT DOCUMENTS

| | | |
|---|---|---|
| JP | 2006-125331 | 5/2006 |
| JP | 2008-101535 | 5/2008 |
| JP | 2008-248710 | 10/2008 |

OTHER PUBLICATIONS

Written Opinion of the International Searching Authority mailed Jul. 19, 2011 in corresponding International Application No. PCT/JP2011/061223.

International Search Report of Corresponding PCT Application PCT/JP2011/061223 mailed Jul. 19, 2011.

Patent Abstracts of Japan, Publication No. 2008-248710, Published Oct. 16, 2008.

Patent Abstracts of Japan, Publication No. 2000-303826, Published Oct. 31, 2000.

Patent Abstracts of Japan, Publication No. 2006-125331, Published May 18, 2006.

Patent Abstracts of Japan, Publication No. 2008-101535, Published May 1, 2008.

* cited by examiner

SELECTIVE CATALYTIC REDUCTION SYSTEM

CROSS-REFERENCE TO RELATED APPLICATIONS

This application claims the benefit of Japanese Patent Application No. 2010-113747, filed on May 17, 2010, the contents of which is incorporated herein by reference, which serves as priority for PCT Application No. PCT/JP2011/061223, filed May 16, 2011.

TECHNICAL FIELD

The present invention relates to an SCR system that purifies exhaust gas by ejecting a urea aqueous solution to the exhaust gas of a diesel vehicle, and more particularly, to an SCR system that can defrost the urea aqueous solution without interruption of warm air of an engine or heating of a vehicle cabin.

BACKGROUND ART

As an exhaust gas purifying system for purifying NOx in the exhaust gas of a diesel engine, an SCR system using an SCR (selective catalytic reduction) apparatus has been developed.

The SCR system supplies the urea aqueous solution upstream of the exhaust gas of the SCR apparatus, generates ammonia by heat of the exhaust gas, and reduces and purifies NOx on an SCR catalyst by the ammonia (see, for example, Patent Document 1).

PRIOR ART DOCUMENTS

Patent Document 1: Japanese Patent Application Publication No. 2000-303826

The urea aqueous solution is frozen at −10° C. Since an outdoor temperature is low in the winter time or a cold region, there is a case in which the urea aqueous solution is frozen at a cold start of the engine. The urea aqueous solution is injected into an exhaust pipe by using an injector called a dosing valve, and the urea aqueous solution cannot be injected when the urea aqueous solution is frozen or is like a sherbet in a urea aqueous solution tank or even one site between the urea aqueous solution tank and the dosing valve.

As a countermeasure thereof, a cooling line that circulates cooling water of the engine is inserted into the urea aqueous solution tank to configure a tank heater. The tank heater can defrost the urea aqueous solution by exchanging heat between the cooling water and the urea aqueous solution. A tank heater valve that switches the supply of the cooling water to the tank heater is provided on the cooling line. By opening the tank heater valve as necessary, the urea aqueous solution may be defrosted by actuating the tank heater and the temperature of the urea aqueous solution in the urea aqueous solution tank may be raised to a target temperature. This is called defrosting control. When the temperature of the urea aqueous solution in the urea aqueous solution tank reaches the target temperature, it may be determined that all of the urea aqueous solutions from the urea aqueous solution tank to the dosing valve are defrosted, and as a result, the defrosting control ends. The defrosting control ends, and as a result, the urea aqueous solution may be injected into the exhaust pipe and a purification effect of exhaust gas is acquired.

However, in cold start, the cooling water of the engine also has the same low temperature as an ambient temperature. Since the cooling water flows to the tank heater when the defrosting control begins at the time of starting the engine, heat of the cooling heater is absorbed by the frosted urea aqueous solution, and as a result, the temperature of the cooling water is difficult to increase.

Further, when an outdoor temperature is low like the case where the urea aqueous solution is frozen, there are many cases where heating by an air-conditioner is performed from the time when the engine is started. Since heating is performed by using the heat of the cooling water even in the air-conditioner of the vehicle, when the temperature of the cooling water is difficult to increase, the temperature of warm current of air blown into the cabin of the vehicle from an outlet of the air-conditioner is difficult to increase. That is, a state in which heating is not performed is continued for a long time to cause a driver to get an unpleasant feeling.

Further, when the state in which the temperature of the cooling water is low is continued, the urea aqueous solution is not defrosted and it takes a long time to defrost all the urea aqueous solutions. When the temperature of the urea aqueous solution in the urea aqueous solution tank is not increased up to a desired temperature although the defrosting control is continued for a long time, it may be misdiagnosed that the tank heater valve is faulty in faulty diagnosis.

Meanwhile, since the outdoor temperature is high in the summer time or a warm region, the temperature of the cooling water is increased without delay in spite of the cold start, and as a result, the defrosting control may begin when the engine is started. Further, in this case, since the temperature of the urea aqueous solution has already reached the target temperature when the defrosting control begins, the defrosting control immediately ends and the urea aqueous solution can be injected.

SUMMARY OF THE INVENTION

Accordingly, an object of the present invention is to solve the problems, and provide an SCR system that can defrost the urea aqueous solution without interruption of warm air of an engine or heating of a vehicle cabin.

To achieve the object described above, an SCR system includes: a urea aqueous solution tank configured to retain a urea aqueous solution to be injected into an exhaust pipe of an engine; a temperature sensor provided in the urea aqueous solution tank and configured to detect the temperature of the urea aqueous solution; a tank heater line inserted into the urea aqueous solution tank; a tank heater valve configured to divergently distribute cooling water of the engine to the tank heater line; a defrosting control unit configured to open the tank heater valve at the time of starting the engine and close the tank heater valve when the temperature of the urea aqueous solution detected by the temperature sensor reaches a predetermined defrosting completion determination value; and a warm air priority control unit configured to prohibit the opening of the tank heater valve by the defrosting control unit when the temperature of the cooling water is less than a predetermined defrosting permission value and permit the opening of the tank heater valve by the defrosting control unit when the temperature of the cooling water is equal to or more than the defrosting permission value.

The SCR system may further include: a defrosting permission value map in which the defrosting permission value is given for each outdoor temperature so that the defrosting permission value is decreased as the outdoor temperature is high, and the warm air priority control unit may set the defrosting permission value by referring to the defrosting permission value map as the outdoor temperature.

(1) The urea aqueous solution can be defrosted without interruption of warm air of an engine or heating of a vehicle cabin.

DETAILED DESCRIPTION

Hereinafter, preferred embodiments of the present invention will be described with reference to the accompanying drawings.

Figure 1:
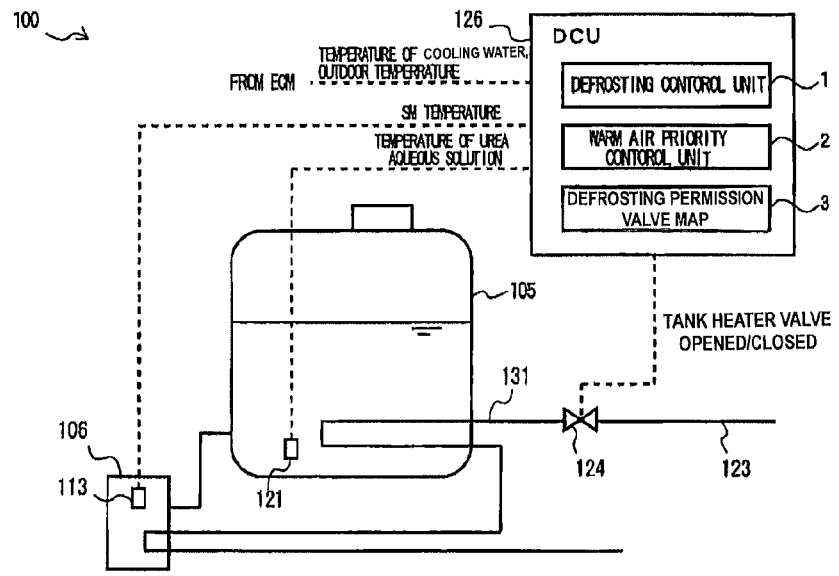
FIG. 1 is a configuration diagram of principal components of an SCR system according to an embodiment of the present invention.
Figure 2:
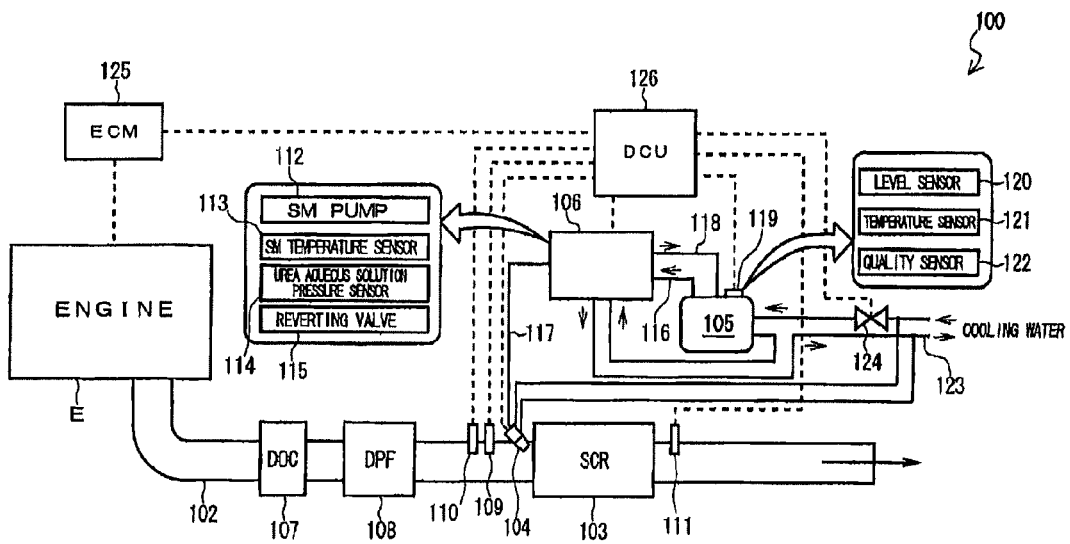
FIG. 2 is a configuration diagram, in detail, illustrating the SCR system according to the embodiment of the present invention.

As illustrated in FIGS. 1 and 2, a SCR system 100 according to the present invention includes a urea aqueous solution tank 105 configured to retain a urea aqueous solution to be ejected into an exhaust pipe 102 of an engine E, a temperature sensor 121 provided in the urea aqueous solution tank 105 and configured to detect the temperature of the urea aqueous solution, a tank heater line 131 inserted into the urea aqueous solution tank 105, a tank heater valve 124 configured to divergently distribute cooling water of the engine to the tank heater line 131, a defrosting control unit 1 configured to open the tank heater valve 124 at the time of starting the engine and close the tank heater valve 124 when the temperature of the urea aqueous solution detected by the temperature sensor 121 reaches a predetermined defrosting completion determination value, and a warm air priority control unit 2 configured to prohibit the opening of the tank heater valve 124 by the defrosting control unit 1 when the temperature of the cooling water is less than a predetermined defrosting permission value and permit the opening of the tank heater valve 124 by the defrosting control unit 1 when the temperature of the cooling water is equal to or more than the defrosting permission value.

Further, in the embodiment, the SCR system 100 includes a defrosting permission value map 3 in which the defrosting permission value is given for each outdoor temperature so that the defrosting permission value is decreased as the outdoor temperature is high. The warm air priority control unit 2 sets the defrosting permission value by referring to the defrosting permission value map 3 as the outdoor temperature.

The SCR system 100 includes a dosing valve 104 configured to inject the urea aqueous solution into the exhaust pipe 102 and a supply module 106 provided between the dosing valve 104 and the urea aqueous solution tank 105 and configured to supply or recover the urea aqueous solution to or from the dosing valve 104. The tank heater line 131 is inserted into the supply module 106 and when the tank heater valve 124 is opened, the cooling water is circulated in even the supply module 106 in addition to the urea aqueous solution tank 105.

The defrosting control unit 1 is configured to perform defrosting control at all the times when the temperature of the urea aqueous solution of the urea aqueous solution tank 105 detected by the temperature sensor 121 is less than a predetermined target value, when the temperature (SM temperature) of the supply module 106 detected by an SM temperature sensor 113 is less than a predetermined target value, and when the outdoor temperature is less than a predetermined defrosting required outdoor temperature value, in a state in which the opening of the tank heater valve 124 is permitted by the warm air priority control unit 2. When the temperature of the urea aqueous solution is equal to or more than the target value, the SM temperature is equal to or more than the target value, and a predetermined time elapsed after the defrosting control is executed and begun, the defrosting control ends.

In detail, as illustrated in FIG. 2, the SCR system 100 primarily includes an SCR apparatus 103 provided in the exhaust pipe 102 of the engine E, a dosing valve (a urea aqueous solution injecting device, a dosing module) 104 configured to inject the urea aqueous solution upstream of the SCR apparatus 103 (upstream of the exhaust gas), a urea aqueous solution tank 105 configured to retain the urea aqueous solution, a supply module 106 configured to supply the urea aqueous solution retained in the urea aqueous solution tank 105 to the dosing valve 104, and a DCU (dosing control unit) 126 configured to control the dosing valve 104 or the supply module 106.

In the exhaust pipe 102 of the engine E, a DOC (diesel oxidation catalyst) 107, a DPF (diesel particulate filter) 108, and the SCR apparatus 103 are sequentially arranged from upstream to downstream of the exhaust gas. The DOC 107 oxidizes NO in the exhaust gas exhausted from the engine E to form $NO_2$ and is used to improve denitration efficiency in the SCR apparatus 103 by controlling a ratio of NO and $NO_2$ in the exhaust gas. Further, the DPF 108 is used to collect PM (particulate matter) in the exhaust gas.

The dosing valve 104 is provided in the exhaust pipe 102 upstream of the SCR apparatus 103. The dosing valve 104 has a structure in which an injection hole is provided in a cylinder filled with high-pressure urea aqueous solutions and a valve body clogging the injection hole is attached to a plunger, and is configured to inject the urea aqueous solution by making the valve body be spaced apart from the injection hole by raising the plunger through electrical conduction to a coil. When the electrical conduction to the coil stops, the plunger is dropped by internal elastic force, and as a result, the valve body clogs the injection hole, thereby stopping the injection of the urea aqueous solution.

An exhaust temperature sensor 109 configured to measure the temperature of the exhaust gas at an inlet of the SCR apparatus 103 (the temperature of an inlet of the SCR) is provided in the exhaust pipe 102 upstream of the dosing valve 104. Further, an upstream NOx sensor 110 configured to detect a NOx concentration upstream of the SCR apparatus 103 is provided upstream of the SCR apparatus 103 (herein, upstream of the exhaust temperature sensor 109), and a downstream NOx sensor 111 configured to detect the NOx concentration downstream of the SCR apparatus 103 is provided downstream of the SCR apparatus 103.

The supply module 106 includes an SM pump 112 configured to pump the urea aqueous solution, an SM temperature sensor 113 configured to measure the temperature of the supply module 106 (the temperature of the urea aqueous solution that flows in the supply module 106), a urea aqueous solution pressure sensor 114 configured to measure the pressure of the urea aqueous solution in the supply module 106 (the pressure at a discharge side of the SM pump 112), and a reverting valve 115 configured to switch supplying the urea aqueous solution from the urea aqueous solution tank 105 to the dosing valve 104 or reverting the urea aqueous solution in the dosing valve 104 to the urea aqueous solution tank 105 by switching a path of the urea aqueous solution. Herein, when the reverting valve 115 is in an off state, the urea aqueous solution from the urea aqueous solution tank 105 is configured to be supplied to the dosing valve 104 and when the reverting valve 115 is in an on state, the urea aqueous solution in the dosing valve 104 is configured to be reverted to the urea aqueous solution tank 105.

When the reverting valve 115 is switched to supply the urea aqueous solution to the dosing valve 104, the supply module 106 is configured to feed the urea aqueous solution in the urea aqueous solution tank 105 and suction the fed urea aqueous solution through a solution sending line (suction line) 116, in the SM pump 112, supply the suctioned urea aqueous solution to the dosing valve 104 through a pumping line (pressure line) 117, and revert a remnant urea aqueous solution to the urea aqueous solution tank 105 through a recovery line (back line) 118.

An SCR sensor 119 is provided in the urea aqueous solution tank 105. The SCR sensor 119 includes a level sensor 120 configured to measure the height (level) of the solution level of the urea aqueous solution in the urea aqueous solution tank 105, a temperature sensor 121 configured to measure the temperature of the urea aqueous solution in the urea aqueous solution tank 105, and a quality sensor 122 configured to measure the quality of the urea aqueous solution in the urea aqueous solution tank 105. The quality sensor 122 detects the concentration of the urea aqueous solution or whether a heterogeneous mixture is mixed in the urea aqueous solution, from, for example, a propagation velocity of ultrasonic waves or electrical conductivity, and detects the quality of the urea aqueous solution in the urea aqueous solution tank 105.

A tank heater line 131 diverged from a cooling line 123 configured to circulate cooling water for cooling the engine E is connected to the urea aqueous solution tank 105 and the supply module 106. The tank heater line 131 passes through the urea aqueous solution tank 105 to exchange heat between the cooling water that flows from the cooling line 123 and the urea aqueous solution in the urea aqueous solution tank 105. The tank heater line 131 passes through the supply module 106 to exchange heat between the cooling water that flows from the cooling line 123 and the urea aqueous solution in the supply module 106.

A tank heater valve (coolant valve) 124 configured to switch the supply of the cooling water to the urea aqueous solution tank 105 and the supply module 106 is provided in a connection site between the cooling line 123 and the tank heater line 131. Further, the cooling line 123 is connected to even the dosing valve 104, but the cooling water is supplied to the dosing valve 104 regardless of opening/closing of the tank heater valve 124. Although not illustrated due to simplification of the drawing in FIG. 2, the tank heater line 131 and the cooling line 123 are installed along the solution sending line 116, the pumping line 117, and the recovery line 118 through which the urea aqueous solution passes.

Figure 3:
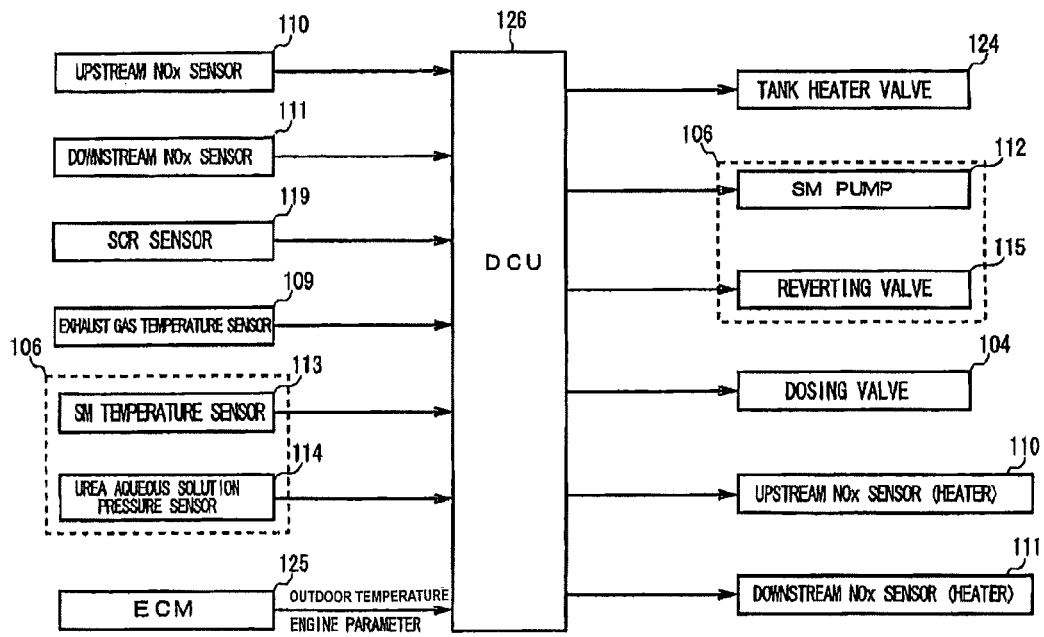
FIG. 3 is an input/output configuration diagram of the SCR system of FIG. 1.

FIG. 3 illustrates an input/output configuration diagram of the DCU 126.

As illustrated in FIG. 3, input signal lines from the upstream NOx sensor 110, the downstream NOx sensor 111, the SCR sensor 119 (the level sensor 120, the temperature sensor 121, and the quality sensor 122), the exhaust temperature sensor 109, the SM temperature sensor 113 and the urea aqueous solution pressure sensor 114 of the supply module 106, and an ECM (engine control module) 125 configured to control the engine E are connected to the DCU 126. Signals of an outdoor temperature, the temperature of the cooling water, and engine parameters (engine rpm, and the like) are input from the ECM 125.

Output signal lines to the tank heater valve 124, the SM pump 112 and the reverting valve 115 of the supply module 106, the dosing valve 104, a heater of the upstream NOx sensor 110, and a heater of the downstream NOx sensor 111 are connected to the DCU 126. An input/output of signals between the DCU 126 and each member may be an input/output through individual signal lines or an input/output through a CAN (controller area network).

The DCU 126 is configured to determine the amount of the urea aqueous solution ejected from the dosing valve 104 based on the estimated amount of NOx in the exhaust gas as well as estimating the amount of NOx in the exhaust gas based on signals of the engine parameters from the ECM 125 and the temperature of the exhaust gas from the exhaust temperature sensor 109, and further, control the dosing valve 104 based on a detection value of the upstream NOx sensor 110 and adjust the amount of the urea aqueous solution ejected from the dosing valve 104 when the urea aqueous solution is ejected at the amount of the urea aqueous solution determined in the dosing valve 104.

Hereinafter, an operation of the SCR system 100 according to the present invention will be described.

Figure 4:
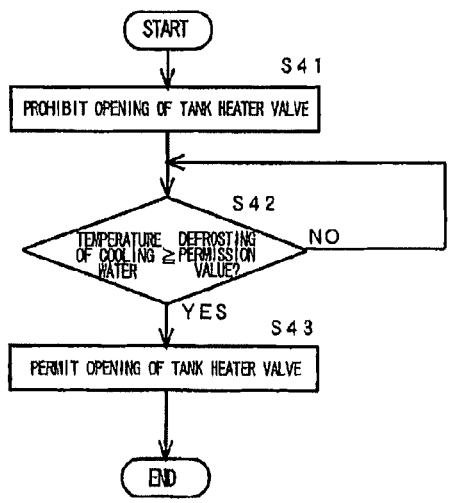
FIG. 4 is a flowchart illustrating a sequence of warm air priority processing according to the present invention.

As illustrated in FIG. 4, in step S41, the warm air priority control unit 2 prohibits the opening of the tank heater valve 124 in advance (for example, when an ignition switch is key-on).

Subsequently, the warm air priority control unit 2 determines whether the temperature of the cooling water is equal to or more than the defrosting permission value in step S42. In the case of NO, the process returns to step S42. That is, when the temperature of the cooling water is less than the defrosting permission value, the process waits with the opening of the tank heater valve 124 being prohibited.

In the case of YES as the determination of step S42, since the temperature of the cooling water is equal to or more than the defrosting permission value, the warm air priority control unit 2 permits the opening of the tank heater valve 124 in step S43.

Meanwhile, the defrosting control unit 1 is configured to open the tank heater valve 124 when the engine is started. However, when the opening of the tank heater valve 124 is prohibited by the warm air priority control unit 2, the tank heater valve 124 is not opened. When the opening of the tank heater valve 124 is permitted by the warm air priority control unit 2, the defrosting control unit 1 opens the tank heater valve 124 to begin the defrosting control.

The defrosting control unit 1 may determine that all the urea aqueous solutions are defrosted from the urea aqueous solution tank 105 to the dosing valve 104 when the temperature of the urea aqueous solution detected by the temperature sensor 121 is equal to or more than the defrosting completion determination value, the temperature (SM temperature) of the supply module 106 detected by the SM temperature sensor 113 is equal to or more than the target value, and a predetermined time set, in advance, for each outdoor temperature elapsed after the defrosting control is executed and begun and thus the defrosting control unit 1 terminates the defrosting control by closing the tank heater valve 124.

As described above, according to the SCR system 100 of the present invention, since the opening of the tank heater valve 124 by the defrosting control unit 1 is prohibited when the temperature of the cooling water is less than the predetermined defrosting permission value and the opening of the tank heater valve 124 by the defrosting control unit 1 is permitted when the temperature of the cooling water is equal to or more than the defrosting permission value, the defrosting control of the urea aqueous solution is not executed and heating by the warm air of the engine and an air-conditioner is preferentially performed, and the engine is rapidly warmed and heating is early achieved, at cold start in the winter time or a cold region to thereby cause the driver to feel pleasant. Further, since the engine is rapidly warmed, when the defrosting control is thereafter begun, the urea aqueous solution is rapidly defrosted and is increased in temperature, and misdiagnosis does not occur in fault diagnosis of the tank heater valve 124.

Further, according to the SCR system 100 of the present invention, the defrosting permission value map 3 is provided, in which the defrosting permission value is given for each outdoor temperature so that the defrosting permission value is decreased as the outdoor temperature is high, and the warm air priority control unit 2 is configured to set the defrosting permission value by referring to the defrosting permission value map 3 as the outdoor temperature, and as a result, the defrosting permission value may be set so that the defrosting control is begun at the same time when the engine is started, under a condition that the temperature of the cooling water rises without delay even in the cold start like the summer time or the warm region. In this case, the defrosting control is immediately terminated, and the urea aqueous solution may be injected substantially at the same time when the engine is started.

The invention claimed is:

1. A selective catalytic reduction system, comprising:
a urea aqueous solution tank holding a urea aqueous solution to be injected into an exhaust pipe of an engine;
a temperature sensor provided for the urea aqueous solution tank to detect a temperature of the urea aqueous solution;
a tank heater line in the urea aqueous solution tank;
a tank heater valve to provide cooling fluid of the engine to the tank heater line;
a defrosting control device to open the tank heater valve and defrost the urea aqueous solution when frozen, and close the tank heater valve, when the temperature of the urea aqueous solution detected by the temperature sensor reaches a predetermined defrosting completion determination value; and
a warm air priority control device to prohibit the opening of the tank heater valve by the defrosting control device when starting the engine and when a temperature of the cooling fluid is less than a predetermined defrosting permission value, and permit the opening of the tank heater valve by the defrosting control device when the temperature of the cooling fluid is equal to or more than the defrosting permission value.

2. The selective catalytic reduction system according to claim 1, further comprising:
a defrosting permission value map in which the defrosting permission value is given for outdoor temperatures so that the defrosting permission value is decreased when the outdoor temperature is high,
wherein the warm air priority control device sets the defrosting permission value by referring to the defrosting permission value map as the outdoor temperature.

* * * * *